United States Patent [19]

Pomeroy et al.

[11] Patent Number: 4,487,271
[45] Date of Patent: Dec. 11, 1984

[54] PORTABLE CORE DRILL

[76] Inventors: Dan M. Pomeroy, 3720 Constitution Ave., Lummi Island, Wash. 98262; Russell F. Burmester, 143 E. Laurel Rd., Bellingham, Wash. 98226

[21] Appl. No.: 348,609

[22] Filed: Feb. 12, 1982

[51] Int. Cl.³ .............................................. B27B 17/00
[52] U.S. Cl. ................... 173/29; 144/35 A; 173/46; 173/57; 408/20
[58] Field of Search ............... 279/20, 52; 408/20, 408/204, 203, 59, 145; 144/35A, 1 F; 173/57, 29, 163, 46

[56] References Cited

U.S. PATENT DOCUMENTS

| | | | |
|---|---|---|---|
| 2,937,029 | 5/1960 | Colby | 279/20 |
| 3,003,493 | 10/1961 | Miller | 408/145 |
| 3,024,030 | 3/1962 | Koch | 279/20 |
| 3,308,689 | 3/1967 | MacDonald | 408/204 |
| 3,580,342 | 5/1971 | Matthews | 173/29 |
| 3,592,554 | 7/1971 | Takahara | 408/204 |
| 3,719,367 | 3/1973 | Baturka | 279/52 |
| 3,736,991 | 6/1973 | Maine | 408/20 |
| 3,759,336 | 9/1973 | Marcovitz et al. | 408/20 |
| 3,791,660 | 2/1974 | Bostley | 408/59 |
| 3,905,609 | 9/1975 | Sussman | 408/59 |
| 4,227,840 | 10/1980 | Thivierge | 144/35 A |
| 4,331,883 | 5/1982 | Vitaloni | 173/29 |

Primary Examiner—Frank T. Yost
Assistant Examiner—Hien H. Phan
Attorney, Agent, or Firm—Hughes, Barnard & Cassidy

[57] ABSTRACT

A portable core drill adapted for sampling dense mineral specimens or the like by urging a fluid cooled/lubricated tubular drill bit into a dense mineral mass from which a sample is to be extracted is comprised of a drive member for imparting a drilling-effective rotary motion to a tubular drill bit about a longitudinal drill axis and a spindle member for coupling the drill bit to the drive member, which spindle member includes a bit fastening member for receiving and retaining the drill bit concentrically in respect of the drill axis. The bit fastening member, in turn, is comprised of a bit-engaging collet member, received in a collet housing having tapered sidewalls and an end wall, and a rotatable compression member (i) for constricting the collet member about the outer sidewall of the drill bit at or near the proximal end thereof upon rotation and (ii) for engaging an element on the collet member and urging the collet member outwardly of the collet housing upon counter-rotation; whereby the drill bit may be operatively engaged with and disengaged from the bit fastening member by hand rotation and counter-rotation of the compression member, respectively.

14 Claims, 4 Drawing Figures

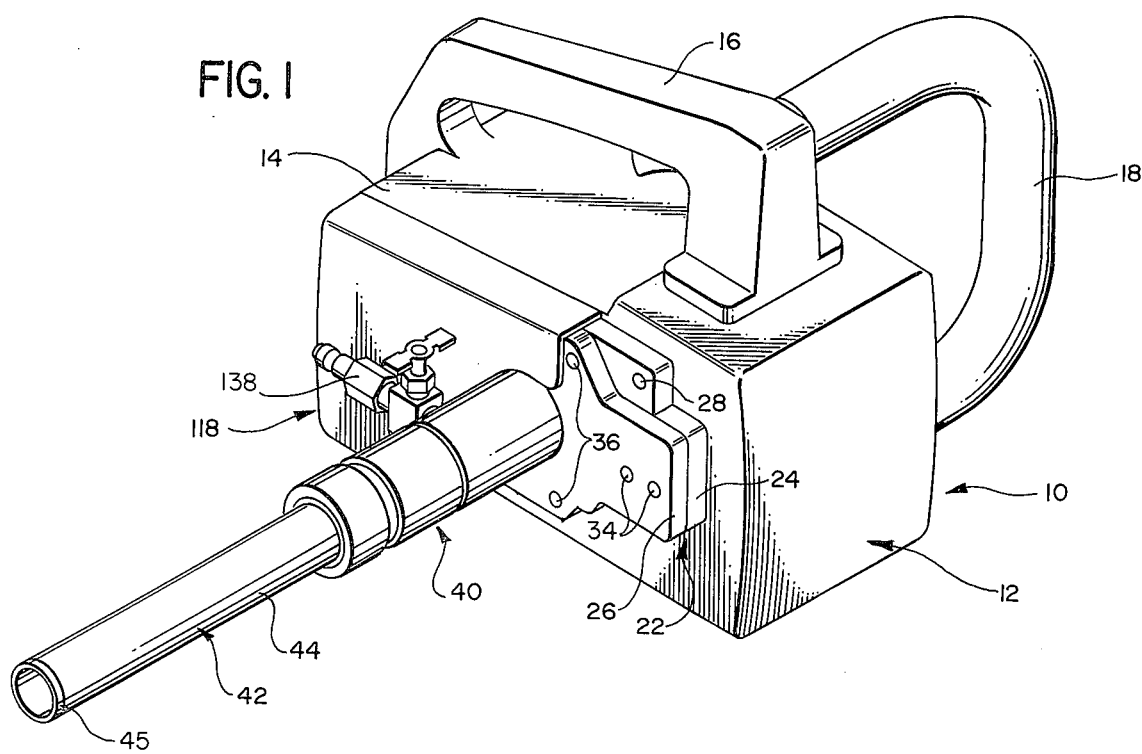
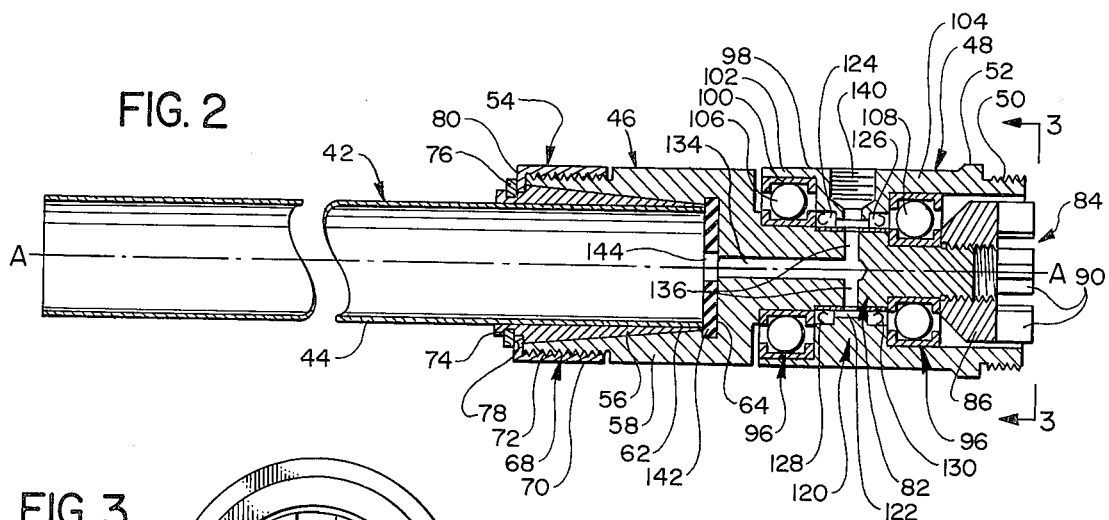
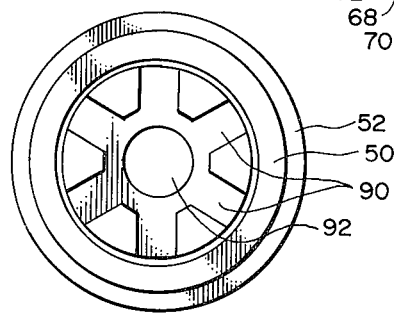

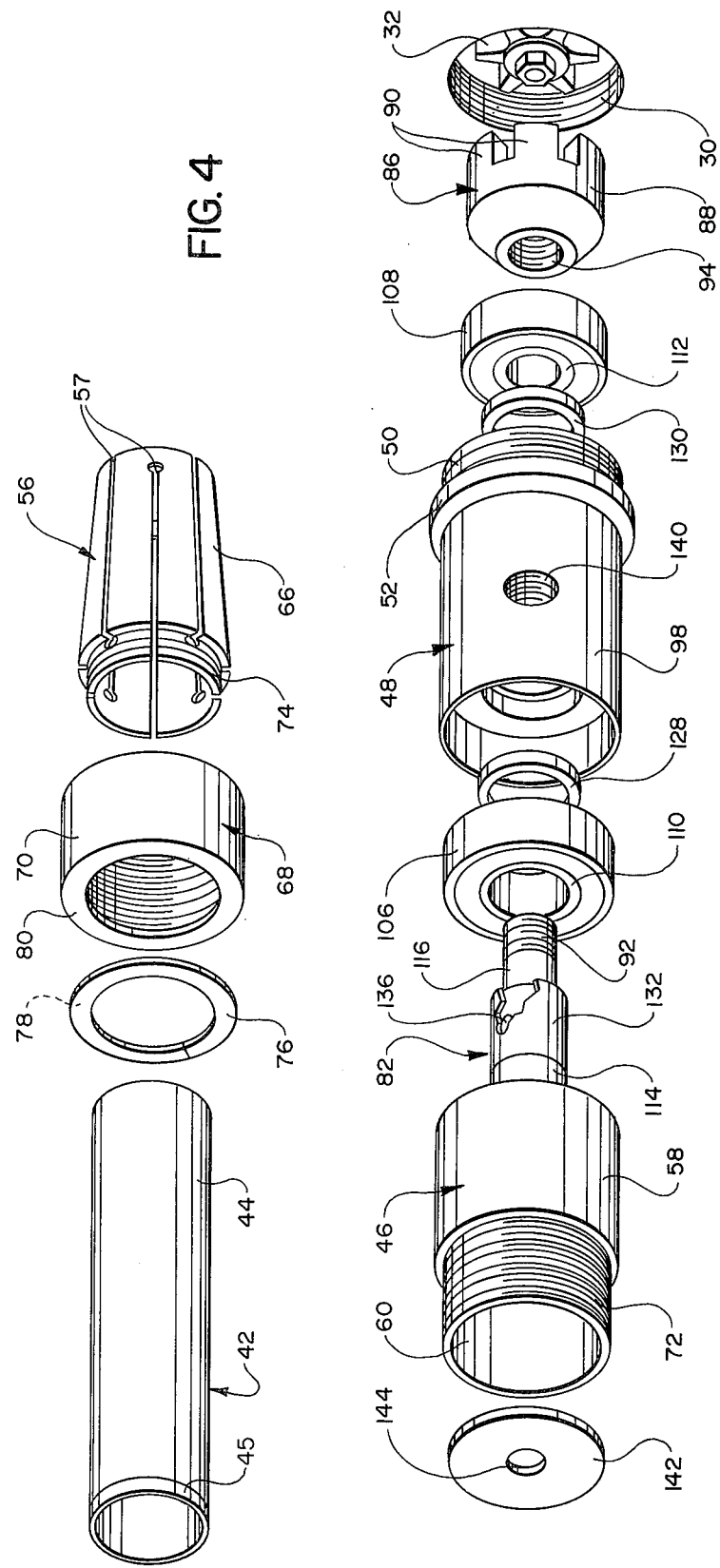

PORTABLE CORE DRILL

BACKGROUND OF THE INVENTION

1. Field the Invention

The present invention relates, generally, to core drills for sampling mineral specimens or the like and, more especially, to a portable core drill for this purpose which may be transported with relative ease even to very remote locations.

2. Description of the Background Art

Myriad endeavors require core sampling in order to extract a specimen from a larger mass for the purpose of ascertaining the physical and/or chemical morphology of the latter. All manner of materials are sampled in this way, ranging from relatively loosely compacted substances (e.g., soil) through extremely dense mineral substances (e.g., granite). It is with respect to the denser materials from which cores are extracted that the instant invention particularly pertains.

Geological studies, particularly paleomagnetic research, include core sampling techniques as a mainstay of the scientific undertaking. The core drills employed to obtain core specimens from large mineral formations are all characterized by certain general features. The drill bit utilized is typically a tubular steel member, sometimes stainless steel, tipped with a peripheral circumferential abrading element, usually in the form of a ring of a matrixed diamond abrasive or other suitable abrasive substance. The tubular drill bit is rotated about a drill axis and urged against and thence into the dense mass (e.g., granite); the bit then withdrawn and the specimen snapped from the parent mass. Normally, the drill bit is cooled with a fluid coolant which might simply be water or which might also include a lubricating component, such as a water-soluble oil, antifreeze or another drilling adjuvant dictated by the circumstances.

Where such rock sampling is undertaken in areas accessible by roadways, the survey team is usually not unduly limited in the types of drive motors or engines which might be employed to impart drilling-effective rotary motion to the drill bit. However, a substantial effort has been and continues to be made in the geological studies of rock morphology in very remote regions. It is now common for a survey team to hike many days into very remote areas to conduct these studies. This places considerable demands on the type of equipment which might be employed for core sampling. For example, the core drill must be as compact and as light and as free of required tools as possible so that it may be carried to these remote locations with minimum difficulty or discomfort, oftentimes through very difficult terrain. On the other hand, durability and reliability in operation cannot be sacrificed for portable mobility.

Some efforts have been made to meet these needs and, to varying extents, some goals have been achieved. Perhaps one of the more significant steps toward providing a durable and reliable portable core drill has been the relatively recent adaptation of chain saw engines as the drive member for the drill. It is now possible to obtain a chain saw engine which weights as little as about 8 to 9 pounds and yet one which can deliver sufficient power to operate the drill. Various adapters to couple the drill bit to the chain saw engine have been devised to convert the engine to a useable drive for a drill.

One approach in the design of a coupling member has simply been to weld or otherwise secure a nut on the end of the tubular drill and thread the nut/bit assembly onto a mating coupler on the engine. This approach suffers somewhat for a number of reasons limiting the desirability of the technique. First, even tedious layup rarely insures complete concentricity and squareness of the nut as respects the drill axis. Hence, a wobbling motion may be imparted during the drilling operation which at least is undesirable but which may also contribute significantly to excessive wear and vibration of the bit and motor assembly. Second, this approach necessitates carrying tools for assembly and disassembly thereby adding to the weight of the load to be carried and a significant inconvenience in operation. Third, the proximal nut typically obstructs the interior of the drill bit, making removal of a broken core specimen an inconvenient task.

Another suggestion has incorporated a type of rubber-flex collet to couple the drill bit to the drive engine. This approach improves on the ability to align the drill concentrically but the structure employed in this type of device nonetheless requires one to carry tools in order to assemble and disassemble the drill components. Overall, the core drill is bulky and heavy, limiting its desirability.

Other problems pervade the use of existing devices for core sampling. For example, it is always desirable and sometimes mandatory to provide a coolant fluid, which might also act as a lubricant, to the drill bit during operation. It is most desirable to be able to inject or otherwise transmit the fluid along and throughout the annular path of the tool bit. While this can sometimes be achieved externally of the drill itself, as by application of fluid to the outer surfaces of the drill bit during operation, it is better to introduce this coolant/lubricant internally and allow the same to escape externally of the drill bit. This provides improved cooling and lubricating characteristics during operation and also aids in carrying away or flushing particle debris from the active drilling point. To achieve this goal, the fluid should somehow be introduced to the drill bit through the coupling member. In some designs, where the coupling member rotates, this can be a difficult task to perform. In every design, however, it is important to maintain fluid integrity of the coupler so that all operating components are fluid-sealed. This has yet to be realized as a practical matter.

Accordingly, the need still exists to provide a lightweight, compact, yet durable and dependable, portable core drill which requires no tools for assembly or disassembly and yet which includes a drive connector or coupler which may deliver fluid to the drill and which further provides a highly concentric rotary drilling motion as respects the drilling axis.

SUMMARY OF THE INVENTION

The present invention advantageously provides an improved, portable core drill which is highly compact and lightweight and yet which, in service, is both durable and reliable. The present invention also advantageously provides a core drill, the components of which can be assembled and disassembled with ease by hand operations, thus eliminating the need to carry additional tools and their associated weight. Still further, the present invention advantageously provides a core drill having a drive coupler or adapter which insures highly concentric rotary motion for the drill bit in respect of the drilling axis. Yet further, the present invention advantageously provides a core drill, the components of which are fluid tight so that coolant and/or lubricant may be introduced internally of the drill bit during operation.

These and other advantages are realized by a portable core drill adapted for sampling dense mineral specimens or the like by urging a fluid cooled/lubricated drill bit into a dense mineral mass from which a sample is to be extracted, comprising a drive member for imparting a drilling-effective rotary motion to a tubular drill bit about a longitudinal drill axis and a spindle member for coupling the drill bit to the drive member. The spindle member includes a bit-fastening member for receiving and retaining the drill bit concentrically in respect of the drill axis. This bit-fastening member is comprised of a bit-engaging collet member received in a collet housing having tapered sidewalls and an end wall and further includes a rotatable compression member which serves, inter alia, (i) to constrict the collet member about the outer sidewall of the drill bit at or near the proximal end thereof upon a tightening rotation and (ii) to engage an element on the collet member and urge the collet member outwardly of the collet housing upon a loosening counter-rotation. Accordingly, the drill bit may be operatively engaged with, and disengaged from, the bit fastening member by hand rotation and counter-rotation of the compression member, respectively.

In accordance with one aspect of the invention, this feature is achieved, in part, in a preferred structural arrangement where the open entry end of the collet member is provided with a radially extending ring and the compression member with a radially extending lip disposed for engagement with the ring upon counter-rotation of the compression member. When that occurs, the collet is urged slightly out of the collet housing effecting a positive removal or releasing action of the collar from the collet housing.

The portable core drill of the present invention preferably includes fluid valving and distributing means for admitting a fluid coolant/lubricant, preferably a pressurized fluid, to the spindle member and discharging same through the collet housing internally of the drill bit. In one preferred form of the present invention, the spindle is comprised of a drive shaft secured at its distal end to the collet housing and at its proximal end to a spindle drive means, such as a drive dog, gear or pulley, for operative engagement with the drive means, most preferably a chain saw engine or similar portable engine. The drive shaft is preferably formed with a central longitudinal bore for transmitting fluid to the collet housing. This central bore is in fluid communication with an annular chamber disposed radially outward and intermediate the length of the drive shaft. Preferably, the annular fluid chamber is defined between first and second fluid seals disposed internally of a bearing case which envelops the drive shaft. A fluid port in the bearing case permits the introduction of fluid coolant and-/or lubricant to the fluid chamber which is transmitted through e.g., at least one radial fluid aperture in the drive shaft which communicates with the central bore. A fluid seal is preferably disposed at the end wall of the collet housing with an aperture therein in registration with the terminus of the bore in the drive shaft; which fluid seal is provided for sealing engagement with the proximal end of the drill bit. Consequently, fluid admitted through the bearing case is transmitted to the interior of the rotating drill bit and also serves to cool the moving parts of the spindle member.

Other advantages of the present invention, and a fuller understanding of its structure and mode of operation, will be gained upon a further examination of the detailed description of the invention, taken in conjunction with the figures of drawing, wherein:

BRIEF DESCRIPTION OF THE DRAWINGS

FIG. 1 is an isometric view of a portable core drill in accordance with the present invention;

FIG. 2 is a sectional view of the coupling member or adapter of the drill of the present invention, shown retaining a tubular drill bit;

FIG. 3 is an end view of the coupler shown in FIG. 2, viewed along line 3—3 thereof; and, FIG. 4 is a detailed, exploded view of the components comprising the adapter of the present invention.

DETAILED DESCRIPTION OF THE INVENTION

The present invention relates, generally, to core drills and, more especially, to portable core drills which employ a portable engine such as a chain saw engine as a drive means; which drills are adapted for sampling dense mineral specimens such as rock specimens by urging a fluid cooled/lubricated tubular drill bit into a dense mineral mass from which the sample is to be extracted. Accordingly, while the invention will now be described with reference to certain preferred embodiments within the aforementioned context, those skilled in the art will appreciate that such a description is meant to be exemplary only and not limitative.

Turning to the figures of drawing, in all of which like parts are identified with like reference numerals, FIG. 1 illustrates a portable core drill in accordance with the present invention, designated generally as 10. The core drill 10 most preferably employs a standard chain saw engine, denoted generally as 12, as the drive means. A particularly preferred engine is the one marketed by the Kioritz Corp. under the tradename "ECHO", Model CS-280E; although other comparable engines might be employed, giving due consideration to weight and power delivery. As is conventional, the chain saw engine 12 is comprised of an outer case 14 having an upper handle 16 and a side handle or brace 18. As is also typical, these gasoline powered engines are provided with a trigger-type lever 20 for speed regulation. Although specifically adapted for use as a saw, the configuration of a chain saw engine such as 12, with the saw bar removed, is very convenient in its adaptation as the drive means for imparting a drilling-effective rotary motion to a tubular drill bit in a core drill.

The engine 12 is converted for use as the drive means for a core drill by removing the chain saw bar and providing a coupling plate, identified generally as 22 in FIG. 1. Preferably, the coupling plate 22 is comprised of two metal plates identified 24 and 26. The first plate 24, having a central aperture (not shown) somewhat larger than the drive clutch or gear of the engine, is secured directly to the engine 12. The plate 24 is secured in any convenient way, preferably by means of threaded fasteners 28, one of which is shown in FIG. 1. The second plate 26 is then secured to the first plate 24 in a way to insure concentricity of the drill components with the drive axis of the drive output member in the engine 12. The plate 26 is formed with a threaded aperture 30, best viewed in FIG. 4, for receipt of the coupler and drill bit components as described below. The threaded aperture 30 should be located vis-a-vis the drive member 32 of the engine 12, again best viewed in FIG. 4, so that the center of aperture 30 is as close to coincident with the center of rotation of drive member 32 as can reasonably be achieved. This insures a uniformity of alignment of components along the drilling axis, identified by the line A—A in FIG. 2, which in turn yields a smoother and more reliable operation of the drill while minimizing excess vibration and wearing of the components comprising same.

This concentric alignment is achieved by careful positioning of plate 26 on plate 24, using a measuring device or centering plug to obtain the desired relationship between the plates vis-a-vis the drilling axis. When using a chain saw engine as the preferred drive means for drill 10, the same will customarily include a pair of studs 34 projecting outwardly of the case 14 for receipt of the chain saw bar. These studs 34 provide a very convenient means of clamping plate 26 over the plate 24 while locating and spot drilling, as well as providing structural integrity in the final configuration. In one preferred technique, clearance holes are provided in the inner plate 24, which is secured directly to the engine by, e.g., three fasteners 28 received in threaded holes on the engine. Oversized apertures are first formed in the outer plate 26 as are a plurality (e.g., 3-4) of pilot holes positioned suitably about its periphery. The plate 26 is then positioned over plate 24 with the studs 34 projecting through the clearance holes therein, which are oversized sufficiently to allow movement of plate 26 on plate 24. Using a measuring device or a centering plug, the axis of the threaded aperture 30 is located coincident with that of the drive 32 and nuts on the studs 34 secured in place to maintain that registration. The pilot holes in plate 26 are then drilled further to form registering holes in plate 24. The plates are removed from engine 12; the pilot holes in plate 26 opened to receive the shank of threaded fasteners 36 and the registering holes in plate 24 are threaded for engagement with the fasteners 36. Subsequently, plate 24 is resecured to the engine by means of the fasteners 28, and plate 26 is secured in position by means of threaded fasteners 36 and nuts on the studs 34. This assembly locates the axis of the aperture 30 coincident with that of the drive 32 and maintains this alignment during use, minimizing shifting of the plates relative to one another or, collectively, relative to the drive 32.

A coupler or adapter 40 is secured to plate 26, which drive-couples the engine 12 to a tubular drill bit identified generally as 42. The drill bit, as is conventional, is comprised of a tubular steel shank 44 terminating at its distal end in a diamond tip or collar 45. These drill bits may be procured commercially (a suitable bit being obtainable from Felker Bay State Abrasives of Los Angeles, Calif.); for geological sampling they are nominally about one inch in inner diameter and about eight inches long, but other sizes and configurations might be employed to good advantage in combination with the core drill of the present invention.

The adapter 40 is comprised generally of a spindle means 46 and a bearing case means 48. The bearing case 48 is a stationary member having a generally cylindrical overall outer configuration terminating in a threaded end 50 and a shoulder 52 inwardly bounding same. The threaded end 50 is designed to mate securely with the threaded aperture 30 in plate 26 in order to secure the adapter 40 and associated drill bit 42 to the engine 12. The shoulder 52 is included to locate the adapter 40 properly on the coupling plate 22. It is preferred that the mating threads 30 and 50 have a right-hand twist so that there is a reduced tendency for vibration of the engine to loosen the adapter 40 during use. Should one employ an engine which has a counter clockwise drive rotation, this arrangement would of course be reversed to a left hand twist in that event.

Spindle means 46 includes bit fastening means 54 for engaging and retaining drill bit 42 at or near the proximal end thereof. Bit fastening means 54 is comprised of bit-engaging collet means 56 received within a collet housing 58. The collet 56 is provided with a series of longitudinally extending slots 57, best viewed in FIG. 4, alternating from end to end and terminating intermediate the length of the collet. These slots impart flexible resiliency to the collet so that transverse or radial constriction will allow it to collapse slightly to a reduced diameter for effective restraining engagement with bit 42. The collet housing 58 includes a recess or socket 60 best viewed in FIG. 4, having tapered sidewalls 62 and an end wall 64. The taper angle of walls 62 are mated with the taper on the frustoconical walls 66 of the collect member 56; about 5° of taper per side being preferred. These mating walls are also preferably polished to improve the fit of the collet within the housing and reduce tendencies for the former to become trapped or seized in the latter.

The bit fastening means 54 also includes a compression member 68. Compression member 68 is shown to include a threaded collar 70 for mating engagement with a threaded portion 72 at the distal end of collet housing 58. As is generally conventional, rotation of the compression member 68 constricts the diameter of the collet 56 by collapsing same slightly thereby capturing the proximal end of the drill bit 42, as shown best in FIG. 2. To guard against tendencies for loosening of the components, the threads on the collar 70 and collet housing 58 are preferably provided with a left-hand twist (which would be reversed if using an engine turning counterclockwise).

Collets such as the assembly shown for bit fastening means 54, when employed in conventional designs, habitually lock, or have a distinct tendency towards seizing, in the housing receiving same. This is true notwithstanding any polishing of the mating components and the inclusion of anti-seize compounds. Customarily, collets are employed in devices where they may be tapped from the rear for unlocking and thereby dislodging it from the housing. That is not a viable mode of operation for the portable drill 10. Accordingly, the collet component is modified in accordance with one aspect of the present invention to insure positive dislodging and insure that the drill may be assembled and disassembled without the need to resort to the use of tools.

For this purpose, a groove 74 is formed at or near the proximal end of collet 56. The groove 74 illustrated herein is preferably a circumferential groove having a radially outward orientation. A ring 76 is disposed within the groove to present an engagement surface 78 having a radially outward profile. The threaded collar 68 of compression member 70 includes a peripheral circumferential lip 80 for mating engagement with the surface 78. Thus, upon rotation of the collar 78 in the normal sense, the collet is compressed to retain and restrain the drill bit 42. However, upon counter-rotation of the collar 78, the lip 80 engages the ring 76 which is secured within the groove 74 and urges the collet 56 slightly out of the collet housing 58, thereby releasing the bit 42. While all manner of variations might be made on this structure, designed to accomplish the positive release of the collet, the most preferably configuration is viewed in FIGS. 2 and 4 where the ring 76 is simply a snap ring which might be snapped within the groove 74 and maintained firmly therein by virtue of the resilience of the components. However, this same function could be achieved by a series of pins or the like on the collet; the preference for the ring/lip assembly being one of convenience of manufacture.

Spindle means 46 also includes a drive shaft 82 leading from the collet housing 58 and terminating in drive-engaging means 84. In the preferred form shown, the drive-engaging means 84 is comprised of a drive dog 86 having a generally tapered cylindrical body portion 88 and a plurality of engaging cogs 90 which will mate with the drive member 32 of engine 12. The terminus of drive shaft 82 is provided with threads 92 for mating engagement with a threaded internal bore 94 on the drive dog. Again, as a consequence of the clockwise rotation of most engines such as the chain saw engine 12, the threads 92 and 94 preferably have a left-hand twist. Thus, rotational motion from the drive member 32 is coupled through the dog 86 to drive shaft 82 which, in turn, rotates spindle means 46 relative to the bearing case 48. Depending on the type of drive member on the engine, other configurations for engaging the drive shaft thereto might be employed, such as gears or pulleys or a direct coupling to the clutch drum; the design of which is well within the skill of the art.

Drive shaft 82 is journalled for rotation within the bearing case 48 by bearing means identified generally as 96. The bearing case 48 is preferably a generally cylindrical member having an outer cylindrical face 98 and a stepped inner face 100. The stepped inner face 100 is illustrated to be formed with first and second bearing seats 102 and 104 for receipt of bearing members 106 and 108, respectively. In the preferred form shown, each of the bearings 106 and 108 is a ball bearing having an internal race, 110 and 112 respectively. Preferably, the drive shaft 82 is stepped down from a first diameter 114 to a lesser one 116 and the race diameter for bearing 108 is correspondingly less than that for bearing 106. In the preferred design illustrated herein, the front or distal bearing 106 receives all of the thrust during drilling, effectively isolating or decoupling the engine drive. Thus, since no thrust loading is imparted to or realized by the engine, its service life is prolonged. This thrust-decoupling feature might also be achieved by including a conventional thrust bearing, but the ball bearing design remains preferred for ease of assembly and disassembly should replacement become necessary.

It is generally desirable and oftentimes crucial to provide a fluid coolant and/or lubricant to the drill bit 42 when sampling mineral specimens. When doing so, the effectiveness of the fluid coolant/lubricant is enhanced if it can be delivered through the internal portion of the drill bit and then migrate outwardly through the annular drill channel externally of the drill bit and also thereby flush drilling debris away. For this purpose, a fluid delivery system 118 is preferably included.

The outer diameter of drive shaft 82 is preferably configured vis-a vis an internal stepped portion 120 of the bearing case 48 to yield a fluid chamber 122 disposed radially outward and intermediate the length of the drive shaft 82. The stepped portion 120 of the bearing cafe is formed to provide first and second seats 124 and 126 for receipt of first and second seals 128 and 130 respectively. The seals 128 and 130, preferably lip seals, define the outer boundaries of the fluid chamber 122 and seal the bearings against fluid coolant or lubricant introduced into this chamber. As noted in greater detail below, the principal components of the instant adapter 40 are most preferably fabricated from aluminum. However, it has been determined that the portion of the drive shaft 82 in contact with the seals 128 and 130 should be brass as opposed to aluminum since better wear characteristics are achieved. Accordingly, the portion of drive shaft 82 in contact with seals 128 and 130 is preferably machined with a slight step over which a brass sleeve 132 is disposed in a close interference fit. Thus, in the most preferred embodiment of the present invention, the drive shaft 82 is formed with two steps in an initial fabricating technique, but the first step is then fitted with the brass sleeve 132 so that, in effect, only a single step occurring outwardly proximate bearing 108 is realized. Optionally, these same characteristics may be realized by forming the shaft entirely from brass, or the same type of sleeve arrangement might be used on, e.g., a stainless steel shaft.

The drive shaft 82 is formed with a central longitudinal bore 134. At least one and preferably at least two radial apertures 136 are formed in the drive shaft 82 within the general confines of fluid chamber 122 in order to provide fluid communication between the chamber 122 and central bore 134. For ease of manufacture, the two fluid apertures 136 might simply be made by drilling a hole entirely through the radial extent of the drive shaft 82. If desired, two or more additional apertures might be formed in the same way. In any event, fluid introduced to the chamber 122 will flow through the aperture(s) 136 into the central bore 134 and thence into the interior of collet housing 58.

Fluid coolant or lubricant is admitted to the fluid chamber 122 through a valved fitting 138, preferably having a quick release fitting for convenience, secured within a threaded port 140 in the bearing case 48. The valve 138 is preferably a needle valve so that fluid flow through the drill can be regulated with some precision. Thus, fluid may be admitted internally of the drill bit 42 and, since it flows through the adapter 40 may also serve to cool the moving parts thereof. Further along these lines, it may be desirable to form bore 134 with a depth projecting back to the location of rear seal 130 to enhance this cooling effect for that component. To guard against leakage of fluid entering the collet housing 58, a seal or washer 142 is preferably disposed at the end wall 64 of collet housing 46. The washer 142 is provided with a central fluid aperture 144 generally coincident with the terminus of bore 134 to admit the fluid to the collet housing. The drill bit 42 is received in butting, sealing engagement against the face of washer 142 so that fluid is confined to flow through the interior of the bit only. Alternatively, an O-ring seal might be located externally adjacent the proximal end of bit 42 to provide this sealing function; albeit the flat washer is preferred since drilling forces will improve the sealing effect as the bit is forced against the face of the seal.

The individual components comprising the adapter 40, save the bearings and seals which are commercially available, are easily machined from high tensile strength aluminum alloys; although other materials could be employed at the desires of the designer. Preferably, the collet 56, the snap ring 76, and the drive dog 86 are machined from 7075-T6 aluminum, and the remainder of the components are machined from 2024-T3 aluminum. When aluminum is the material of choice, it is most preferably anodized, which will impart both an improved surface hardness and good corrosion resistance. As noted above, the sleeve 132 on which seals 128 and 130 ride is preferably machined from brass and interference fitted on the aluminum drive shaft. Thus, the adapter can be made light weight and durable.

Assembly and disassembly of the components comprising the core drill 10 is relatively simple and may be achieved without resort to the use of tools. With the adapter 40 assembled into the configuration shown, for example, in FIG. 2, it is hand threaded onto the mounting plate 26 and secured in position by tightening the same to the point allowed by shoulder 52. The compression collar 68 is loosened to relax the collet 56 and the drill bit 42 inserted to its full depth within the collet, so that the proximal end of the drill bit is in butting, sealing engagement with washer 142. The collar 68 is then tightened to grasp the outer sidewall of the drill bit at or near the proximal end thereof and secure the same tightly and concentrically in respect of drilling axis A. The engine may then be started to impart a drilling-effective rotary motion through the drive shaft to the drill. As the abrasive collar or tip 46 penetrates into the material to be sampled, fluid for cooling and/or lubricating is admitted through the valve fitting 138 from a source, preferably a pressurized source (not shown). This fluid is transmitted from the fluid chamber 122 through the radial aperture(s) 136 and central bore 134 and then migrates outwardly, interiorly of the drill bit 42. As the annular cutting channel is formed, this fluid will cool the internal surface of the drill bit, keep the same relatively free from particle build-up as it will flow outwardly along the inner surface and then back along the outer surface of the drill bit and wash or flush abraded particles and mud away. Concomitantly, this fluid will have a tendency to cool the rotating components of the adapter 40. When the cutting operation is completed, counter-rotation of the collar 68 causes the lip 80 on the collar to engage the ring 76 and thereby urge collet 56 slightly outward in respect of the collet housing 58, thus releasing bit 42. The drill bit may then be withdrawn and the adapter 40 removed from the mounting plate 26. And, all of these operations may be achieved by hand without the need to resort to the use of tools. The ability to assemble and disassemble the drill by hand in this way is further facilitated by including a textured gripping surface on the faces of the collet housing 58 and compression member 68. This textured surface might be imparted by knurling these components, by forming longitudinal slots slightly into their surfaces, or by including a laminate of a high-grip material such as rubber, to provide a good grip for the user.

In accordance with the foregoing, the core drill 10 can be seen to be one which is lightweight and compact yet durable and reliable in use. The drawbacks inhering in the use of other conceptually similar core drills are hereby efficiently overcome.

While the invention has now been described with reference to certain preferred embodiments, those skilled in the art will appreciate that various changes, modifications, substitutions and omissions might be made without departing from the spirit thereof. Accordingly, it is intended that the scope of the present invention be limited solely by that of the claims granted herein.

What is claimed is:

1. A portable core drill adapted for sampling dense mineral specimens or the like by urging a fluid cooled/lubricated tubular drill bit into a dense mineral mass from which a sample is to be extracted, said drill comprising:
   (a) drive engine means for imparting a drilling-effective rotary motion to a tubular drill bit about a longitudinal drill axis; and,
   (b) spindle means for drive coupling said drill bit to said drive engine means, said spindle means including thrust decoupling means for axial thrust isolation of said drive engine means from loads impressed upon said drill bit and bit fastening means for receiving and retaining said drill bit concentrically in respect of said axis;
   wherein said bit fastening means comprises bit-engaging collet means received in a collet housing having tapered side walls and an end wall, and rotatable compression means (i) for constricting said collet means about the outer sidewall of said drill bit proximate the proximal end thereof upon rotation of said compression means and (ii) for urging said collet means outwardly of said collet housing along said axis upon counter-rotation thereof, whereby said drill bit may be operatively engaged with and disengaged from said bit fastening means by hand rotation and counter-rotation of said compression means, respectively.

2. The portable core drill of claim 1, further comprising fluid delivery means for admitting a fluid coolant/lubricant to said spindle means and discharging same through said collet housing internally of said drill bit.

3. The portable core drill of claim 2, wherein said spindle means is comprised of a drive shaft secured at its distal end to said collet housing and at its proximal end to a spindle drive means for operative engagement with said drive means, said drive shaft having a central longitudinal bore for transmitting said fluid to said collet housing.

4. The portable core drill of claim 3, further comprising a bearing case enveloping said drive shaft, bearing means disposed within said bearing case supporting said drife shaft for rotation therein and thrust isolation of said drive engine means, and first and second fluid seal means disposed in spaced relationship within said bearing case defining an annular fluid chamber radially outward and intermediate the length of said drive shaft.

5. The portable core drill of claim 4, wherein said bearing case includes a fluid port for admitting said fluid to said fluid chamber and said drive shaft includes at least one fluid aperture for transmitting fluid from said fluid chamber to said central bore.

6. The portable core drill of claim 5, further comprising fluid seal means disposed at said end wall of said collet housing for sealing engagement with the proximal end of said drill bit.

7. The portable core drill of claim 6, wherein said drive engine means is comprised of a portable engine.

8. The portable core drill of claims 1, 2, 3, 4, 5, 6 or 7, wherein said collet means includes ring means disposed proximate the open entry end of said collet means and extending radially outward therefrom, and further wherein said rotatable compression means includes a collar with a radially extending lip for operative engagement with said ring; whereby counter-rotation of said collar causes said lip to engage said ring and urge said collet means outwardly of said collet housing.

9. A portable core drill adapted for sampling dense mineral specimens or the like by urging a fluid cooled/lubricated tubular drill bit into a dense mineral mass from which a sample is to be extracted, comprising a drive engine for imparting rotary motion to a spindle which terminates in a collet disposed in a collet housing, said spindle including a drive shaft journalled in a bearing case for axial thrust-decoupled rotation respecting said drive engine; first and second fluid seal means disposed in sapced relationship within said bearing case defining an annular fluid chamber therebetween radially outward and intermediate the length of said drive shaft; a valved fluid port in said bearing case disposed within the boundaries of said seal means for introducing fluid to said chamber; a central longitudinal bore in said drive shaft extending from said collet housing and terminating in fluid communication with said fluid chamber through at least one radially extending aperture in said drive shaft disposed within the boundaries of said seal means, for transmitting fluid from said fluid chamber to said collet housing; a seal disposed within said collet housing having an aperture therein coincident with the terminus of said bore, for sealing engagement with the proximal end of a tubular drill bit; wherein said collet includes a circumferential ring for engagement with a peripheral lip on a rotatable compression member for constricting said collet upon rotation thereof, whereby counter-rotation of said compression member causes said lip and ring to engage and urge said collet slightly out of said collet housing.

10. A drive coupling for a portable core drill configured to engage a drive means at its proximal end for coupling a drilling-effective rotary motion to a tubular drill bit secured at its distal end with thrust isolation of said drive means, said coupling comprising:
(a) spindle means including a drive shaft having drive engaging means at its proximal end for mating engagement with said drive means and terminating at its distal end in a collet housing having tapered side walls leading to a recessed end wall;
(b) collet means received in said collet housing, including a radially extending ring means proximate the open end thereof;
(c) collet compression means having a rotatable collar with a radially extending lip, wherein rotation of said collar provides a drill bit retaining-effective force on said collet means and counter-rotation of said collar causes engagement of said lip with said ring means and urges said collet slightly out of said collet housing;
(d) a bearing case surrounding said drive shaft;
(e) bearing means disposed within said bearing case for supporting said shaft during rotation thereof and for decoupling axial thrust from said drive means;
(f) first and second fluid seal means disposed in spaced relationship and defining an annular fluid chamber intermediate the length of said drive shaft, said fluid chamber having a fluid inlet port; and,
(g) a central longitudinal bore in said drive shaft having an open discharge end at said recessed end wall and an inlet end in fluid communicaiton with said fluid chamber.

11. The drive coupling of claim 10, wherein said bearing means are comprises of first and second ball bearings seated in said bearing case in spaced relationship externally proximate said first and second seal means, respectively, said bearings receiving said shaft along a radially stepped segment thereof thereby providing said thrust decoupling.

12. A drive coupling for a portable core drill configured to engage a portable drive engine means at its proximal end for coupling a drilling-effective rotary motion to a tubular drill bit secured at its distal end with thrust isolation of said drive engine means, said coupling comprising:
(a) spindle means including a drive shaft having drive engaging means at its proximal end and bit engaging means at its distal end and further including axial thrust isolation means for decoupling drilling loads from drive means for imparting rotary motion to said spindle means, said drive shaft including a longitudinal fluid bore with an inlet and an outlet, wherein said outlet is disposed for transmitting fluid to the interior of a tubular drill bit when engaged in said bit engaging means;
(b) a fluid chamber disposed radially outward and intermediate the length of said drive shaft, including an inlet port for introduction of fluid thereto; and,
(c) aperture means in said drive shaft providing fluid communication between the inlet of said bore and said fluid chamber.

13. The drive coupling of claim 12, wherein said bit engaging means comprises collet means received in collet housing means having tapered sidewalls and a recessed endwall, a central portion of which endwall is coincident with the outlet of said fluid bore; said coupling further comprising seal means disposed at said endwall and having an aperture therein in registration with said outlet, for sealing receipt of the proximal end of said tubular drill bit and for confining flow of fluid from said outlet to the interior of said drill bit.

14. In combination, the drive coupling of claims 10, 11, 12 or 13, a portable chain saw drive engine, and a tubular drill bit.

* * * * *